US012423389B2

(12) United States Patent
Tran et al.

(10) Patent No.: US 12,423,389 B2
(45) Date of Patent: Sep. 23, 2025

(54) SYSTEMS AND METHODS OF DIGITAL RIGHTS MANAGEMENT

(71) Applicant: PEER DATA INC., Englewood Cliffs, NJ (US)

(72) Inventors: Kiet Tran, Old Tappan, NJ (US); Benjamin Logan, Clearwater, FL (US)

(73) Assignee: PEER DATA INC., Englewood Cliffs, NJ (US)

( * ) Notice: Subject to any disclaimer, the term of this patent is extended or adjusted under 35 U.S.C. 154(b) by 0 days.

(21) Appl. No.: 18/962,126

(22) Filed: Nov. 27, 2024

(65) Prior Publication Data

US 2025/0173404 A1    May 29, 2025

Related U.S. Application Data

(60) Provisional application No. 63/603,234, filed on Nov. 28, 2023.

(51) Int. Cl.
*G06F 21/10* (2013.01)
*H04L 9/08* (2006.01)

(52) U.S. Cl.
CPC ............ *G06F 21/107* (2023.08); *H04L 9/088* (2013.01)

(58) Field of Classification Search
CPC ............................... G06F 21/107; H04L 9/088
USPC ........................................................ 713/171
See application file for complete search history.

(56) References Cited

U.S. PATENT DOCUMENTS

| 7,370,017 B1* | 5/2008 | Lindeman | G06F 21/1086 705/53 |
| 2019/0215564 A1* | 7/2019 | Webb | H04N 21/4627 |
| 2023/0205850 A9* | 6/2023 | Bernardi | G06F 21/64 705/59 |
| 2023/0216947 A1* | 7/2023 | Bernardi | H04L 67/10 713/150 |
| 2023/0230091 A1* | 7/2023 | Vaughn | G06Q 20/4016 705/71 |
| 2024/0127211 A1* | 4/2024 | Newton | G06Q 20/065 |

OTHER PUBLICATIONS

International Search Report and Written Opinion issued by the ISA/US in connection with International Application No. PCT/US2024/057677, dated Jan. 27, 2025.

* cited by examiner

*Primary Examiner* — Dereena T Cattungal
(74) *Attorney, Agent, or Firm* — George Likourezos; Carter, DeLuca & Farrell LLP

(57) ABSTRACT

A system for digital rights management includes a peer-to-peer (P2P) network, a processor, and a memory, including instructions stored thereon, which when executed by the processor, cause the system to: transmit a first request for a dataset by a first device to a second device on the P2P network; authenticate the first request at the second device based on a predefined rule; generate an encrypted dataset by the second device based on the authenticated first request; access the encrypted dataset at the first device using a decryption key; and transmit a second request for the dataset by a third device to the first device on the P2P network.

20 Claims, 7 Drawing Sheets

SYSTEMS AND METHODS OF DIGITAL RIGHTS MANAGEMENT

CROSS-REFERENCE TO RELATED APPLICATION

This application claims the benefit of, and priority to, U.S. Provisional Patent Application No. 63/603,234, filed on Nov. 28, 2023, the entire contents of which are hereby incorporated herein by reference in their entirety.

TECHNICAL FIELD

The present application relates to systems and methods of digital rights management, and, more specifically, to a system and method of managing access, distribution, and licensing of digital assets.

BACKGROUND

Digital rights management (DRM) systems have evolved significantly to adapt to the demands of the digital age. DRM refers to a set of technologies, techniques, and methodologies designed to control the use, modification, and distribution of works containing intellectual property such as copyrights, as well as systems within devices that enforce these policies. DRM systems often face challenges related to data exchange, transactional transparency, data licensing, and/or enhanced security.

Accordingly, there is a need for a new DRM system that enables secure, verifiable, and efficient data exchange between and across networks.

SUMMARY

In accordance with aspects of the present disclosure, a system for digital rights management includes a peer-to-peer (P2P) network, a processor, and a memory, including instructions stored thereon, which when executed by the processor, cause the system to: transmit a first request for a dataset by a first device to a second device on the P2P network; authenticate the first request at the second device based on a predefined rule; generate an encrypted dataset by the second device based on the authenticated first request; access the encrypted dataset at the first device using a decryption key; and transmit a second request for the dataset by a third device to the first device on the P2P network.

In an aspect of the present disclosure, the P2P network may include a ledger, a distributed ledger, a blockchain, and/or database.

In another aspect of the present disclosure, the first request may be a license request.

In yet another aspect of the present disclosure, the first request may include an IP address, a URL, a location of the first device, a location of the second device, and/or an intended use case for the dataset.

In a further aspect of the present disclosure, the predefined rule may be a smart contract including an authorized scope, an authorized purpose, and/or regulations related to the dataset.

In yet a further aspect of the present disclosure, the instructions, when executed by the processor, may further cause the system to generate a unique identifier corresponding to the dataset. The unique identifier may include an instrument number, a user identifier, an institution identifier, a license number, and/or a checksum.

In an aspect of the present disclosure, the first request and the second request may form a daisy chain based on the unique identifier.

In another aspect of the present disclosure, the instructions, when executed by the processor, may further cause the system to: authenticate the second request at the first device based on the predefined rule; generate a second encrypted dataset by the first device based on the authenticated second request; and access the encrypted second dataset at the third device using the decryption key.

In yet another aspect of the present disclosure, a log may be recorded on the P2P network for analysis by a machine learning network. The log may be related to the first request and/or the second request.

In a further aspect of the present disclosure, the instructions, when executed by the processor, may further cause the system to: generate a first log by the first device and a second log by the second device; transmit the first log and the second log to the second device and the first device, respectively; generate a first status by the first device and a second status by the second device; determine whether the first status and the second status match; and generate a status of the first request, based on the determination. The first log and the second log may be related to the first request.

In accordance with aspects of the present disclosure, a processor-implemented method for digital rights management includes: transmitting a first request for a dataset by a first device to a second device on a P2P network; authenticating the first request at the second device based on a predefined rule; generating an encrypted dataset by the second device based on the authenticated first request; accessing the encrypted dataset at the first device using a decryption key; and transmitting a second request for the dataset by a third device to the first device on the P2P network.

In an aspect of the present disclosure, the P2P network may include a ledger, a distributed ledger, a blockchain, and/or database.

In another aspect of the present disclosure, the first request may include an IP address, a URL, a location of the first device, a location of the second device, and/or an intended use case for the dataset.

In a further aspect of the present disclosure, the predefined rule may be a smart contract including an authorized scope, an authorized purpose, and/or regulations related to the dataset.

In yet a further aspect of the present disclosure, the method may further include generating a unique identifier corresponding to the dataset. The unique identifier may include an instrument number, a user identifier, an institution identifier, a license number, and/or a checksum.

In an aspect of the present disclosure, the first request and the second request may form a daisy chain based on the unique identifier.

In another aspect of the present disclosure, method may further include: authenticating the second request at the first device based on the predefined rule; generating a second encrypted dataset by the first device based on the authenticated second request; and accessing the encrypted second dataset at the third device using the decryption key.

In yet another aspect of the present disclosure, a log may be recorded on the P2P network for analysis by a machine learning network. The log may be related to the first request and/or the second request.

In a further aspect of the present disclosure, the method may further include: generating a first log by the first device and a second log by the second device; transmitting the first log and the second log to the second device and the first device, respectively; generating a first status by the first device and a second status by the second device; determining whether the first status and the second status match; and generating a status of the first request, based on the determination. The first log and the second log may be related to the first request.

In accordance with aspects of the present disclosure, a non-transitory computer readable storage medium includes instructions that, when executed by a computer, cause the computer to perform a method for digital rights management including: transmitting a first request for a dataset by a first device to a second device on a P2P network; authenticating the first request at the second device based on a predefined rule; generating an encrypted dataset by the second device based on the authenticated first request; accessing the encrypted dataset at the first device using a decryption key; and transmitting a second request for the dataset by a third device to the first device on the P2P network.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
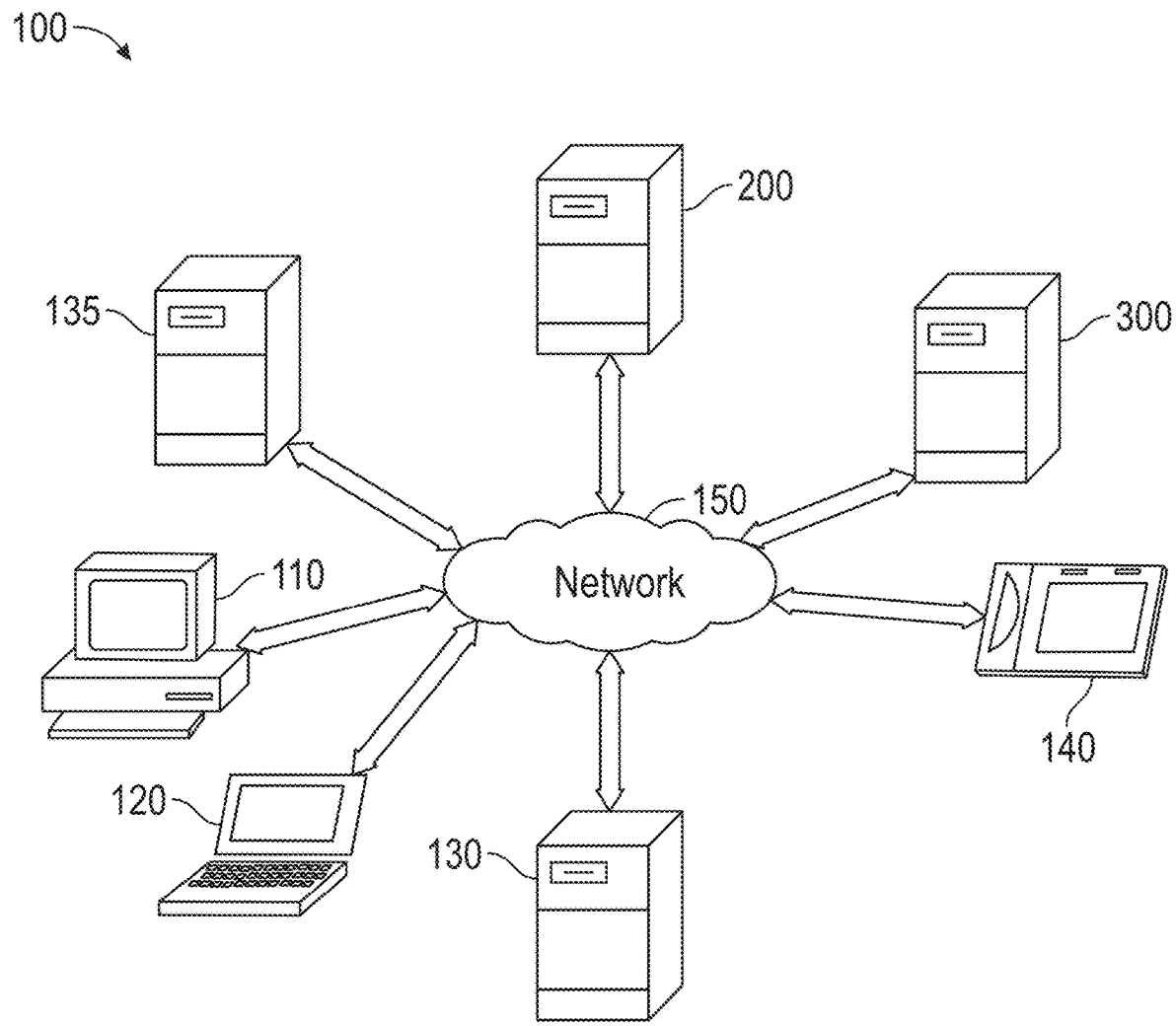
FIG. 1 is a network diagram illustration, which shows an exemplary networked environment for a digital rights management system, in accordance with aspects of the present disclosure.

The present application relates to systems and methods for data transactions.

For the purpose of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Various alterations, rearrangements, substitutions, and modifications of the features illustrated herein, and any additional applications of the principles of the present disclosure as illustrated herein, which would occur to one skilled in the relevant art and having possession of this disclosure, are to be considered within the scope of the present disclosure.

The disclosed digital rights management system is a secure system for processing, validating, and fulfilling requests, which initially focuses on digital rights management for data subscriptions and usage. Operating on a protocol for synchronizing methods of recording and storing data while preserving privacy, the system facilitates efficient and controlled data exchange between networks. Further, the system leverages a closed network and clear agreements for data distribution while maintaining a comprehensive peer-to-peer (P2P) network (e.g., a ledger) for transaction analysis and enabling a "daisy chain" system for indefinite data redistribution.

More broadly, the system includes three key features, which offer multiple applications: (1) federating users or networks indefinitely in a manner that allows one party to make a request of another party, either directly or via one or more conduits; (2) allowing each party in every step of evaluating requests to assume the role of either the party making the request or the party fulfilling the request in whole or in part; and (3) recording details of both parties, the nature(s) of requests and the resulting outcome and delivery of data, derived data, financial data, etc. in a fully traceable and auditable way via blockchain or other P2P networks, which come together in a unique system with multiple potential applications.

The disclosed system includes various benefits and features, including: a secure data exchange ecosystem; daisy chain redistribution; a secure and authenticated network; transparent logging and ledger or other P2P networks; and scalable and flexible data licensing agreement.

Referring to FIG. 1, an exemplary networked environment 100 is shown in accordance with aspects of the present disclosure. The networked environment 100 generally includes one or more client computer systems 110, 120, third party systems 130, 135, a network 150, one or more mobile devices 140, 160, and a digital rights management (DRM) system 200. The client computer systems 110, 120 communicate with the DRM system 200 across the network 150. As persons skilled in the art will understand, the network 150 is illustrated for simplicity and may include multiple wired or wireless networks that utilize technologies such as Wi-Fi®, Ethernet®, Internet Protocol, 4G, and/or 5G, among other communication technologies. For example, the network 150 may include, but is not limited to, a cellular network, residential broadband, satellite communications, an intranet, and/or the Internet, among other networks.

Figure 2:
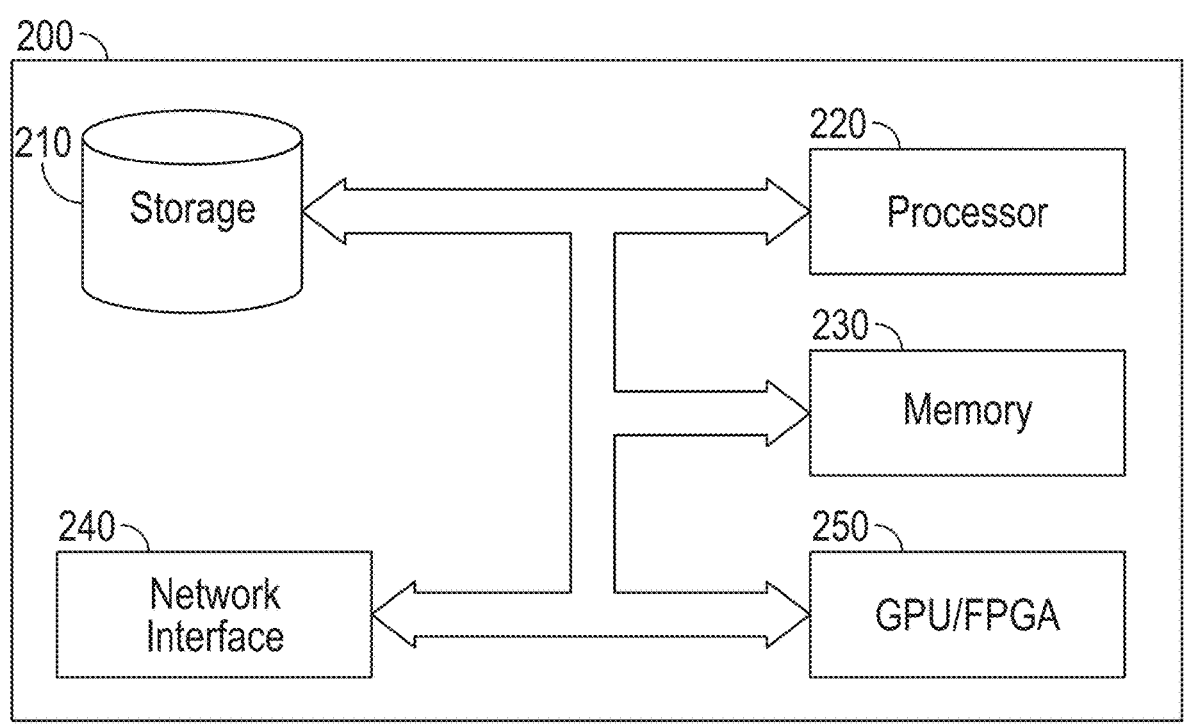
FIG. 2 is a block diagram of example components of the digital rights management system of FIG. 1, in accordance with aspects of the present disclosure.
Figure 3:
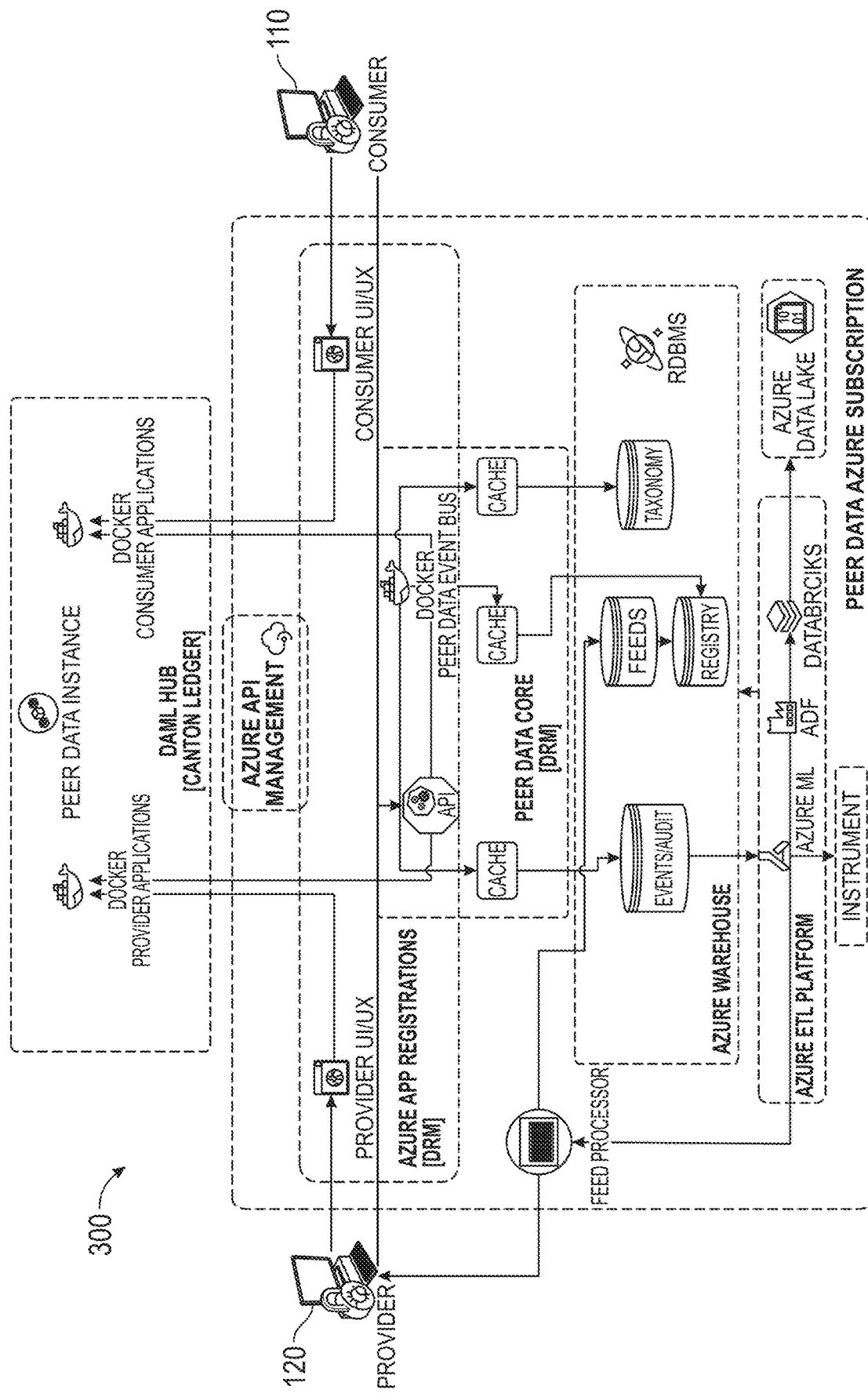
FIG. 3 is an exemplary illustration of the digital rights management system of FIG. 1, in accordance with aspects of the present disclosure.

Referring now to FIGS. 2 and 3, exemplary components of the DRM system 200 are shown in accordance with aspects of the present disclosure. The DRM system 200 generally includes a database 210, one or more processors 220, at least one memory 230, and a network interface 240. In aspects, the controller 200 may include a graphical processing unit (GPU) 250, which may be used for processing machine learning network models.

Database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently holds digital data until purposely erased, such as flash memory, magnetic devices such as hard disk drives, and optical media such as a CD, DVD, Blu-ray Disc™, or the like.

In aspects, data may be stored on DRM system 200, including, for example, user accounts, permissions, licensing documentation, and/or other data. The data can be stored in database 210 and sent via the system bus to processor 220. The database 210 may store information in a manner that satisfies information security standards and/or government regulations, such as SOC 2, GDPR, and/or ISO standards.

As will be described in more detail later herein, processor 220 executes various processes based on instructions that can be stored in the server memory 230 and utilizing the data from database 210. With reference also to FIG. 1, a request from a user device, such as a mobile device or a client computer, can be communicated to the DRM system 200 through the DRM system's network interface 240.

The illustrations of FIGS. 2 and 3 are exemplary, and persons skilled in the art will understand that other components may exist in a DRM system 200. Such other components are not illustrated for clarity of illustration. For example, DRM system 200 may include a daisy chain system (FIG. 5), and a data licensing system (FIG. 6).

In aspects, the DRM system 200 provides a central platform including various features. For example, the central platform may provide dashboards for user management, licensing and access controls, and/or security controls. In addition, the central platform may offer capabilities for monitoring and reporting regarding data, such as insights on popular data, trends, and revenue generated. A user may receive notifications on relevant activities. For example, the notifications may disclose new datasets matching interests or licenses that are about to expire. The user may also provide feedback or obtain support for any issues through an integrated help desk. In aspects, the central platform may integrate with payment gateways to handle transactions. In aspects, the central platform may offer APIs for other systems to integrate and/or pull or push data. For example, the DRM system 200 may integrate with other marketplaces and/or analytical tools.

The DRM system 200 may integrate with blockchain technology or similar P2P networks. The integration provides the benefit over traditional DRM systems of a decentralized and immutable method for handling digital rights management. For example, blockchain integration may provide various features (similar to the above-mentioned features) displayed on a user dashboard. In aspects, blockchain integration may offer immutable record keeping. For example, every time a license is granted or transferred, a transaction may be added to the blockchain and subsequently viewable by the user. The blockchain integration ensures that metadata, descriptions, and/or terms of use are linked to immutable datasets. This provides the benefit over traditional DRM systems of a transparent and tamper-proof record of data access. Further, the blockchain integration allows provider devices and consumer devices to transact directly on the DRM system 200, providing the benefit of decentralization and avoiding reliance on a central authority and/or intermediary. In aspects, blockchain integration may provide users with a decentralized identity, providing the benefits of security and private access. Such access may further be secured through smart contracts via blockchain enforcement. In aspects, cryptographic techniques may provide an additional layer of security, such as hash functions, public-key cryptography, digital signatures, merkle trees, zero-knowledge proofs (ZKP), consensus algorithms (e.g., proof-of-work (PoW)), advanced encryption standard (AES), randomizers (e.g., generation of unpredictable values for key generation, nonce creation, and consensus mechanisms), and/or commitment schemes.

Prior to using DRM system 200, an institution (i.e., a network) is onboarded to the DRM system 200. Generally, onboarding the network to the DRM system 200 includes installing a digital asset node by the network to provide connectivity between the network's data infrastructure and the DRM system 200. The network may integrate the network's existing data infrastructure with the DRM system 200. The integration enables the network to provide or consume data on the DRM system 200, ensures that secure and efficient transfer of data between the network's systems and the DRM system 200, and ensures that data is in a format universally recognized by all parties.

The integration may include establishing a connection using a secure protocol to ensure that data is encrypted on DRM system 200 during a transfer. The secure protocol provides the benefit of protecting data from interception or transfer. For example, integration may include installation of a set of connections to authenticate users and requests, and/or protocols to allow data to be exchanged between the network's systems and the DRM system 200. Installation may include configuring APIs, setting up secure data transmission protocols, and/or mapping data formats or schemas. Persons skilled in the art will understand that different alternative and/or additional procedures may be required to onboard the network to the DRM system 200, based on the configuration of the network and the requirements of the DRM system 200.

In aspects, the network may establish an authorization with a counterparty using a secure protocol. The authorization may include terms and conditions of an overall authorization of activity that is initiated by the counterparty to receive products or services in exchange for money or other compensation. In aspects, the compensation may be fixed and/or variable compensation. The DRM system 200 may directly capture the elements required to calculate the compensation or may receive external inputs. For example, a smart contract, such as a data licensing agreement (DLA) proposed and agreed upon by both the network and the counterparty, may govern the terms of future requests by the consumer device or the provider device (e.g., the provider device of data updates), and/or by any intermediary parties.

The DLA provides the benefits of protection, legality, and transparency for transacting parties. For example, the DLA protects the rights of the provider device, ensures legal use by the consumer device, calculates incremental compensation, and manages expectations. The DLA may be a legal contract including terms and/or conditions for sharing the data. For example, the DLA may specify the scope of data usage (e.g., what data can be shared), ownership of data (e.g., the provider device retains ownership of the data after licensing), duration and termination conditions related to the data, obligations for data handling (e.g., protective measures), fees associated with data exchange, and/or any other data restrictions.

In aspects, the smart contract may be expanded and/or modified to capture and define a general authorization between two parties. For example, two networks may agree to provide a general authorization, under which individual transactions may be requested and approved/rejected, such as a payment network, surveillance and/or access system, or a credit line or loan.

In aspects, the network may upload documentation to the DRM system 200. For example, documentation may include training on how to use the DRM system 200 for various users and/or transaction types.

Once the network is onboarded, the network may register and create a user account. The user account may include business units and individual users. For example, the user account may include a downstream user, such as consumer device 260, and an upstream user, such as provider device 270. The network may define various settings for the user account, including user permissions and access controls. For example, the user account may include separate business units for upstream users and downstream users. In aspects, business units may include both upstream users and downstream users in complex chains. A network, business unit, and/or user may function as an intermediary to perform the roles of both consumer device 260 and provider device 270 devices. In aspects, registration may require e-mail verification by a user (e.g., by consumer device 260).

The consumer device 260 generally initiates a transaction between the consumer device 260 and the provider device 270. The transaction may request the ability to receive or use data from another party, e.g., the provider device 270. In aspects, the consumer device 260 may be a business unit that uses a product or service supplied by the provider device 270. For example, the consumer device 260 may use funds, redeem credits, and/or analyze data supplied by the provider device 270. In aspects, the consumer device 260 and the provider device 270 may have previously agreed to provide a service under terms of the request.

The provider device 270 generally maintains control of the data requested by the consumer device 260. In aspects, the provider device 270 maintains a wide array of permissions, including: read, write, execution, delegation, restriction, revocation, and/or auditing permissions. The provider device 270 may have read permissions to access and view all data related to their content, sales, and distribution on the DRM system 200. Further, the provider device 270 may have write permissions to upload, modify, and/or remove their digital goods and/or services from the DRM system 200. In aspects, the write permissions may include permission to change licensing terms, pricing, and/or daisy chain modifications. The provider device 270 also has execution permissions to initiate processes, such as manual royalty disbursements, content updates, and/or promotions. The provider device 270 may also have delegation permissions, such as granting permissions to other entities or collaborators (e.g., co-authors, co-developers, or partners) to assist in content management. The provider device 270 may have restriction permissions to limit the depth of a daisy chain, set maximum redistribution levels, and/or blacklist certain users or entities from accessing and redistributing content. In addition, the provider device 270 may have revocation permissions to withdraw licenses from consumer device 260 that violate terms and conditions, and/or to ensure content is no longer accessible or redistributable for any reason. Finally, the provider device 270 may have auditing permissions to track and verify all transactions and redistributions, ensuring transparency and trust in DRM system 200.

In aspects, the provider device 270 may be a business unit that supplies the product or service to the consumer device 260. The provider device 270 may generate original data, aggregate data, and/or cleanse data from other sources before providing it to the DRM system 200. In aspects, the provider device 270 may determine whether funds can be advanced under a previously agreed contract with the consumer device 260. For example, the consumer device 260 (e.g., a data subscriber) may request an incremental update of data, and the provider device 270 may have control of the data requested and decide whether to provide the data. In another example, a consumer device 260 may request the use of funds from an account or credit authorization, and the provider device 270 may evaluate the request to determine whether to provide the funds. In aspects, the provider device 270 may pass the request upstream until the request reaches the ultimate owner/controller of the data requested.

In aspects, the provider device 270 may register digital goods and services on DRM system 200, including relevant terms and conditions for licensing (e.g., duration, scope). The provider device 270 may define a pricing model for the digital goods and services (e.g., one-time fee, subscription-based, tiered pricing). Generally, the provider device 270 maintains access to detailed logging (e.g., reports on data exchange) and provides support to consumer device 260 including answering queries, and providing important updates and/or notices.

A consumer device 260 generally seeks access to use the digital goods and/or services. Once registered in the DRM system 200, the consumer device 260 may browse through available digital content and search functionality, filters, and/or categories to find specific content. Where licensing is required, the consumer device 260 may review any terms and conditions. Then, the consumer device 260 may select a licensing option and proceed to payment. In aspects, DRM system 200 provides a dashboard for the consumer device 260 to track usage of any licensed content, view earnings, number of redistribution levels, and/or other relevant metrics. If the original provider device 270 updates digital content, the consumer device 260 may be notified, and/or have the option to access the updated version based on the licensing terms. In aspects, consumer device 260 may provide feedback and rate the digital content, influence reputation on the platform. When the duration of a license approaches an end, the consumer device 260 may receive a notification and/or have the option to renew. This provides the benefit of an option for the consumer device 260 to renegotiate the terms with the provider device 270.

Figure 4:
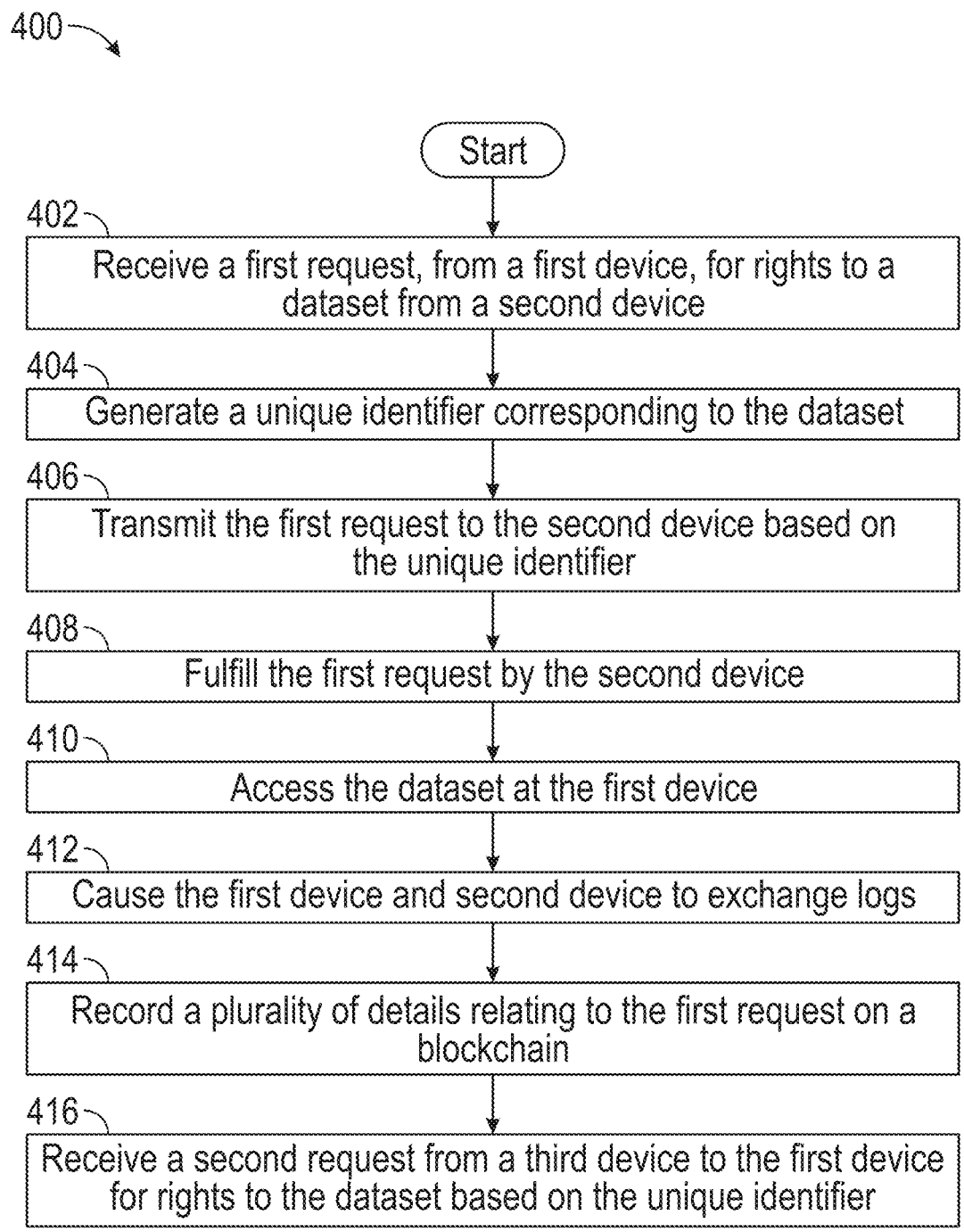
FIG. 4 is a block diagram of example data stored in the digital rights management system of FIG. 1, in accordance with aspects of the present disclosure.
Figure 6:
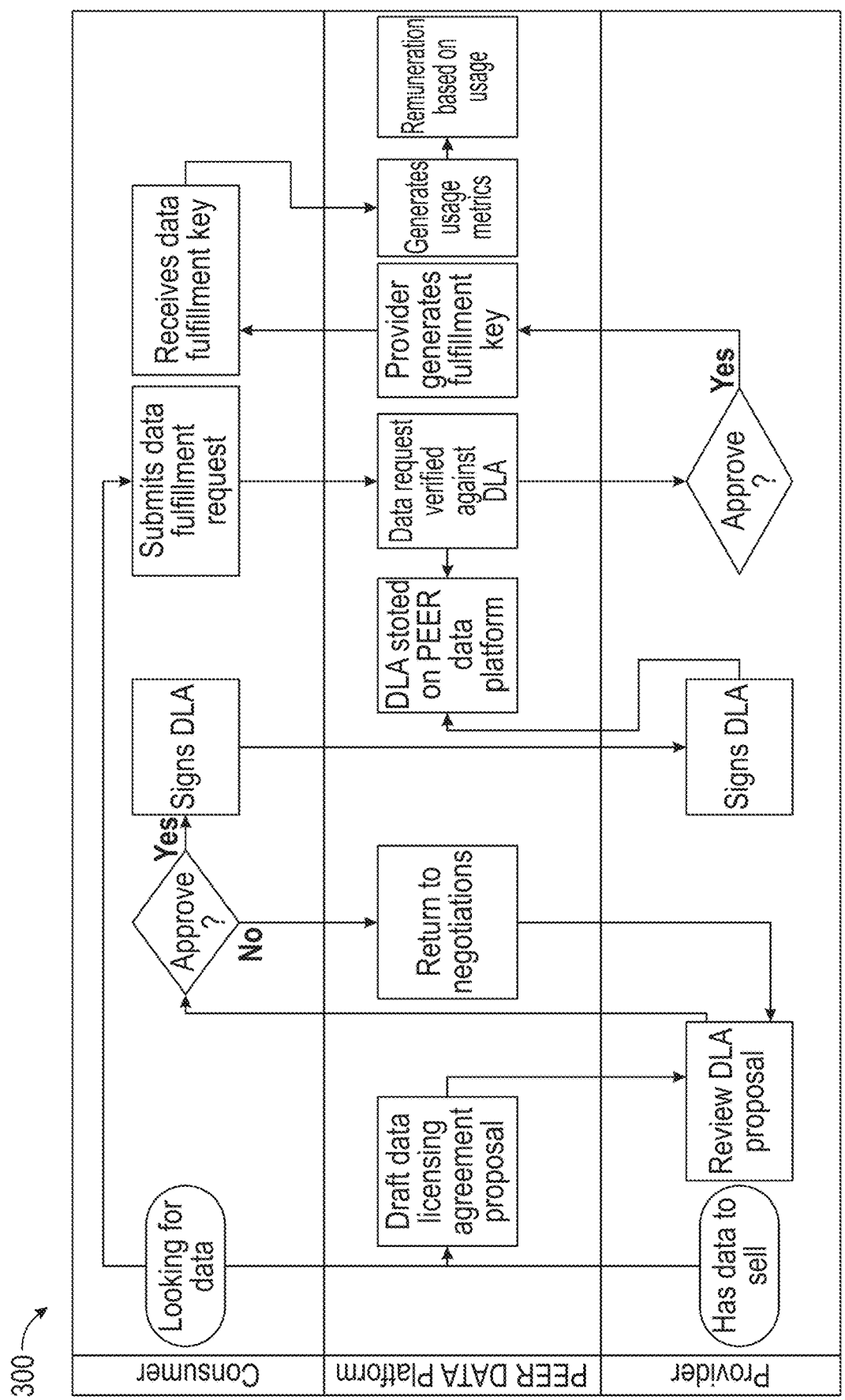
FIG. 6 is an exemplary diagram of a data licensing agreement workflow of the system of FIG. 1, in accordance with aspects of the present disclosure.
Figure 7:
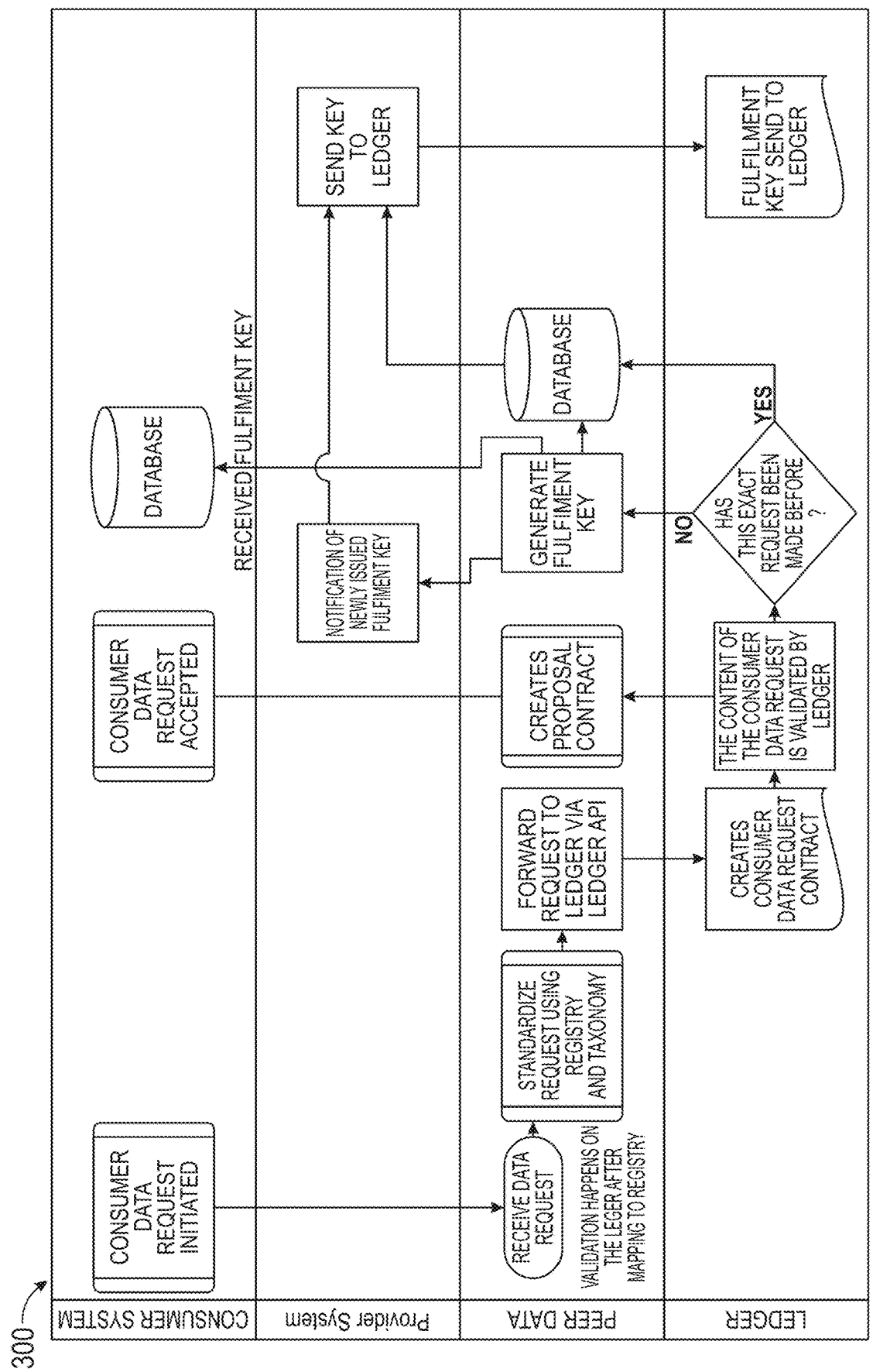
FIG. 7 is an exemplary diagram of a fulfillment key workflow of the system of FIG. 1, in accordance with aspects of the present disclosure.

Referring now to FIGS. 4, 6, and 7, a method for an exemplary use of DRM system 200 is disclosed in accordance with aspects of the present disclosure. Although the steps of method 400 of FIG. 4 are shown in a particular order, the steps need not all be performed in the specified order, and certain steps can be performed in another order. In various aspects, the method 400 of FIG. 4 may be performed all or in part by DRM system 200 of FIG. 1. In other aspects, the method 400 of FIG. 4 may be performed all or in part by another device, for example, a mobile device and/or a client computer system. These and other variations are contemplated to be within the scope of the present disclosure.

First, at step 402, the consumer device 260 (e.g., a first device) submits a request to the provider device 270 (e.g., a second device), such as a request for a service and/or a product, using the DRM system 200 (e.g., through a P2P network). For example, a user may select a movie to watch on a streaming platform via a smartphone, which initiates a request to a content server for a streaming license. The request may be submitted using a peer-to-peer (P2P) network (e.g., blockchain, ledger, distributed ledger, and/or a database, such as database 210) or by messaging a central facilitating party. The request may be for a specific dataset and/or a recurring data feed, and/or some other form of data provision (e.g., a movie, a security, a song, digital art, or a non-fungible token (NFT)). In aspects, the request may include data criteria, an originating party (e.g., consumer device 260), a receiving party (e.g., provider device 270), a date, a time, an IP address, a URL of machine(s) involved, the network, business unit, and/or a location of the consumer device 260 and/or provider device 270. In aspects, the request may include an intended use case for the data. In aspects, the request may include additional data to evaluate the request and/or to submit for reporting or analytical purposes.

The request may be logged by DRM system 200 on both the consumer device 260's side and the provider device 270's side, and/or by an intermediary, including a request time, request scope, and/or additional details relating to the purpose and/or response to the request. Generally, logging is completed on a P2P network of the DRM system 200. The P2P network provides the benefits of aggregation and analysis of data. For example, the DRM system 200 may analyze trends in data requests and denote common issues, bottlenecks, flow through a daisy chain, and/or auditing of transactions for compliance purposes. In aspects, the P2P network may include a comprehensive record of all data transactions within DRM system 200. For example, the DRM system 200 may log details from every transaction, such as data requested, provided, received, etc. In aspects, the logging may include data upstream (from the consumer device 260 to the provider device 270) and downstream (from the provider device 270 to the consumer device 260).

The DRM system 200 may utilize a consistent method or format of logging on to the P2P network. This provides the benefit of consistency, resulting in accurate, comprehensive, and clearly identifiable data that is easy to interpret. For example, the DRM system 200 may include specific unique identifiers in each log in order to cross-reference different logs within a transaction, e.g., a block-hash, a timestamp, a peer ID, a transaction ID, a content ID, a device ID, a license token, an action, and/or a validity duration.

In aspects, the consumer device 260 and provider device 270 may record further details available in the future, such as a summary of data delivered, details or components of individual financial transactions, and/or a game where credits are redeemed. Logging provides the benefit of ensuring transparency, accountability, and record-keeping. For example, logging can resolve disputes or misunderstandings about the data requested or provided. Logging may also provide an audit trail for compliance to show that appropriate procedures were followed. In doing so, the logging can provide insight for data management, such as identifying frequently requested data, monitoring the volume of data requests over time, or describing where different data assets currently reside within an organization or operating environment. The insight may provide further details regarding customers, redistribution partners, and/or network partners.

Next, at step 404, the DRM system 200 generates a unique identifier corresponding to the requested dataset. In aspects, the unique identifier may include a set of values having intrinsic meaning, (e.g., information such as a copyright owner's details, license conditions and/or identifiers, or other metadata relevant to tracking and enforcing rights) and/or with a checksum. For example, a first eight integers may denote an entity (e.g., a user ID or institution ID), a second eight integers may denote an instrument, and a final integer may include a checksum. In another example, the unique identifier may be a Committee on Uniform Securities Identification Procedures (CUSIP) code, an international standard recording code (ISRC), a uniform resource name (URN), a Universally Unique Identifier (UUID), an International Standard Audiovisual Number (ISAN), a unique content ID, and/or a digital watermark. In aspects, the DRM system uses a unique taxonomy system for generating the unique identifier and/or other classification schema, which allows users to uniquely identify and verify datasets in the P2P network (e.g., a multi-part identifier that encodes intrinsic metadata about a dataset and includes a checksum for integrity). For example, for a dataset, DRM system 200 will generate a unique identifier (e.g., by combining the taxonomy fields and calculating the hash) that is shared in a distributed hash table (DHT), so that users downloading the dataset will use the identifier's hash segment to verify integrity against the downloaded data. If the file is updated, a new version field may be appended to the identifier, ensuring both versions remain traceable. In another example, a unique taxonomy system may function as and/or similar to a Digital Object Identifier (DOI) system, where each DOI is a unique alphanumeric string that permanently identifies a dataset including the content type, ownership, and/or access rights. In aspects, unique identifiers may be generated and/or associated with details other than the requested dataset, such as a device ID (e.g., the consumer device 260, the provider device 270), a product ID, a user ID, and/or a specific action to be performed (e.g., action="request_movie_license").

In aspects, when requested datasets are identical across provider device 270, the DRM system 200 ensures that any identifiers are unique to avoid misinterpretation of the data. This provides a benefit over traditional DRM systems of minimizing technological and operational overhead in managing market operations. For example, a unique ID may become a central portion of reference across different provider device 270 to streamline operations, reduce matching error issues, and/or standardize and normalize messages to enable comparison across transactions. Therefore, any usage metrics and/or measurements, i.e., analytics regarding datasets, may occur with minimal disruption to the speed and latency of any data feeds. In aspects, the DRM system 200 includes data identification, mapping, and reference numbering/classification components for data deliverables. A user may use these components to request data, such that provider device 270 may reference specific files and formats without confusion. Such numbering systems may contain business logic representing the dataset, the provider device 270, report headers, file formats, platform purchases, and/or hosting data.

Next, at step 406, the provider device 270 receives the request. For example, the content server may receive the streaming license request from the user in step 402, and the content server with rights relating to the movie will determine whether the user has the requisite subscription to the streaming service for that movie. In aspects, the received request may be recognized based on the unique identifier. A predefined agreement and/or rule and/or automated e.g. self-executing agreement, such as a smart contract referencing an authorization (e.g., a DLA, bank account, etc.), may be used authenticate and/or evaluate the request to determine whether the request falls within a scope of the authorization (e.g., an authorized scope of use and/or purpose), whether the request is technically feasible, and/or whether providing the data would comply with relevant laws, regulations, and policies (e.g., dataset regulations). The data required to complete the evaluation may be contained within the smart contract and/or a broader system and/or rule (e.g., a fraud prevention system). In aspects, the evaluation is configured by either the provider or consumer device 270 based upon security and commercial considerations (FIG. 6).

Based on the evaluation, the provider device 270 may submit a decision. For example, the provider device 270 may agree to fulfill or deny the request (e.g., permit the movie to play on the user device), based on whether the request aligns with the agreed upon terms and conditions. In aspects, the provider device 270 may decide to pass the request upstream to the next link (e.g., entity) in a daisy chain. The decision of the provider device 270 may be recorded in the logging. The logging may include details such as the date and time of the decision, the reasons for the decision, and/or any actions taken by the provider device 270 as a result of the decision.

At step 408, the provider device 270 may fulfill the request, based on the decision and/or evaluation in step 406 and the unique identifier corresponding to the dataset. In doing so, the provider device 270 may send products and/or services downstream to the consumer device 260, and/or to a fixed location for the consumer device 260 to retrieve. For example, the user may be able to stream the movie on the device. Generally, the fulfilled request is prepared and encrypted with an encryption key (e.g., a fulfillment and/or license key) stored on the network by the provider device 270 and/or the intermediary (FIG. 7). Encryption may convert the data into a format that is only in a readable format when decrypted with the correct decryption key. Therefore, encryption provides the benefits of security, a controlled manner of fulfillment, protection from unauthorized access, interception, or tampering, and/or a record of the data provision for transparency and accountability purposes. The closed network, which is not accessible to the public, further enhances the security of the data transmission.

In addition to fulfilling the request, the provider device 270 may record the fulfillment in the logging. The logging entry may include details such as the date and time of the fulfillment, a receipt time, an approved scope of use and/or purpose, the data provided, confirmation that the data was encrypted and transmitted successfully, and/or additional details relating to the purpose and/or response to the request. In aspects, the provider device 270 may attach additional information related to the request (e.g., information stored on the P2P network), such as row counts and/or additional, available balances.

At step 410, the consumer device 260 accesses the fulfilled data request over the secure, closed network. For example, the user streams the selected movie. The consumer device 260 may decrypt the data using a decryption key, converting the data back to a readable format. The decryption key provides the benefit of ensuring that only the intended recipient (e.g., the consumer device 260) can read the data, providing an additional layer of security.

Once the data is decrypted, the consumer device 260 may log receipt of the data, including a time of receipt, the data received, and/or other relevant information. In aspects, the logging may include row counts and other data points (e.g., data used internally or shared externally) for reconciliation or compliance purposes. Logging provides the benefit of a record for auditing, compliance, transparency, and accountability. In addition, logging provides assurances that data is accurate, intact, and secure. After logging the data details, the consumer device 260 may store the data securely in a system for future use.

At step 412, the consumer device 260 and the provider device 270 share logs relating to the request. The shared logs may include detailed records of the entire transaction (e.g., request, decision, and fulfillment details). The consumer device 260 and provider device 270 may review the shared logs to determine a status, which denotes whether the transaction was completed correctly, i.e., according to the agreed upon terms and conditions. The status may be "complete" or "incomplete." If the consumer device 260 and/or provider device 270 agree that the transaction was completed correctly, they may mark the transaction as "complete." For example, the consumer device 260 may generate a first status of "complete" and the provider device 270 may generate a second status of "complete." In aspects, the shared logs may be correlated based on the unique identifier.

If both the consumer device 260 and provider device 270 mark the transaction complete (e.g., both statuses match) the DRM system 200 denotes conclusion of the data exchange. For example, the DRM system 200 may generate a request status of "complete" or "final." If the consumer device 260 and/or provider device 270 have a disagreement with the shared logs, they may mark the transaction in an alternative status (e.g., "incomplete" or "pending"). For example, the consumer device 260 may believe that the received data is not what they requested, and/or the provider device 270 believes that the consumer device 260 did not correctly acknowledge receipt of the data. In aspects, the DRM system 200 may allow consumer device 260 or provider device 270 to flag any outstanding disagreements in the shared logs. This review process of the shared logs provides the continued benefits of transparency, accountability, and efficient resolution of issues in the data exchange process.

At step 414, details relating to the request are logged on to the P2P network. Logging may include aggregating and/or analyzing the details of the transaction through steps 402-410, including generating the request, receipt of the request, fulfillment of the request, accessing the dataset, among other relevant details. Logging may be accessible by both the provider device 270 and the consumer device 260. In aspects, the logging may include aggregation of the first and second logs generated by the first and second devices. In aspects, the logging and/or additional transaction details stored (e.g., on a database) may be stored for analysis, such as predictions by a machine learning (ML) network and/or artificial intelligence (AI). The ML network and/or AI may be used to identify and/or predict data patterns, anomalies, and/or trends to enhance security, compliance, and operational efficiency. For example, unsupervised learning algorithms may detect anomalies and/or deviations in transaction frequencies, geolocations, and device types, which can predict fraudulent data access and license violations, such as exceeding device limits or tampering with tokens. In another example, a recurrent neural network (RNN) may analyze temporal patterns in license requests or content usage, which may be used to optimize content distribution (e.g., by analyzing peak usage patterns) perform real-time monitoring, and/or detect common behaviors of bad actors to preemptively block them. In another example, ML models may be trained to compare transaction hashes and timestamps to expected patterns, and/or ensure consistency in the blockchain's structure to quickly identify discrepancies in the blockchain network. In another example, time-series forecasting models (e.g., ARIMA, LSTMs) may predict transaction volume to ensure scalability and avoid downtimes during high-demand periods.

At step 416, another device (e.g., a third device) may generate a subsequent request for rights to the dataset from the consumer device 260. For example, another user may submit a request on the P2P network. In aspects, the unique identifier may be a key parameter used to retrieve and complete the subsequent request. By retrieving and fulfilling the subsequent request, the consumer device 260 may then function as a provider device 270.

In aspects, a user may begin as a consumer device 260, licensing or accessing a product, service, or piece of data. After consuming the data, a consumer device 260 may recognize a demand or see an opportunity to redistribute, share, and/or sell the data to others. For example, the consumer device 260 may see potential in resharing, repurposing, and/or creating derivative works from the original content. In doing so, the consumer device 260 may become a provider device 270 (i.e., "consumer device 260-turned provider device 270," or "CtP"). Before becoming a provider device 270, the consumer device 260 must verify their rights to redistribute, modify, and/or sell the original or derivative content. The verification may involve reviewing licensing agreements, terms of service, etc.

In aspects, the DRM system 200 may require the CtP to register to become a provider device 270. The DRM system 200 provides the benefit over traditional DRM systems of clear and transparent access to licensing terms and conditions. Once the CtP is registered, the CtP may set the terms for the derivative dataset. In doing so, the CtP can use existing licensing templates and/or create custom licenses. The DRM system 200 facilitates setting up licenses, ensuring that they are legally sound and in line with the platform guidelines. The dataset is then listed on the platform and potential new consumer device 260 can view the metadata, licensing terms, and/or any related financial instruments. In aspects, the CtP may monetize access or usage of their derivative dataset, and/or link the dataset to a financial instrument, such as green loans or bonds. In aspects, the CtP may identify additional datasets to consume, feeding back into the cycle.

The DRM system 200 allows the CtP to monitor the usage and redistribution of their derivative dataset. In aspects, the CtP may track any revenue generated and ensure compliance with licensing agreements. The CtP may utilize their earned revenue from their provider device 270 activities to purchase access to new datasets. In aspects, the CtP may engage with their dataset's consumer device 260, providing support, updates, or modifications based on feedback or evolving needs. In doing so, DRM system 200 provides the benefit of a platform that facilitates direct communication channels.

Figure 5:
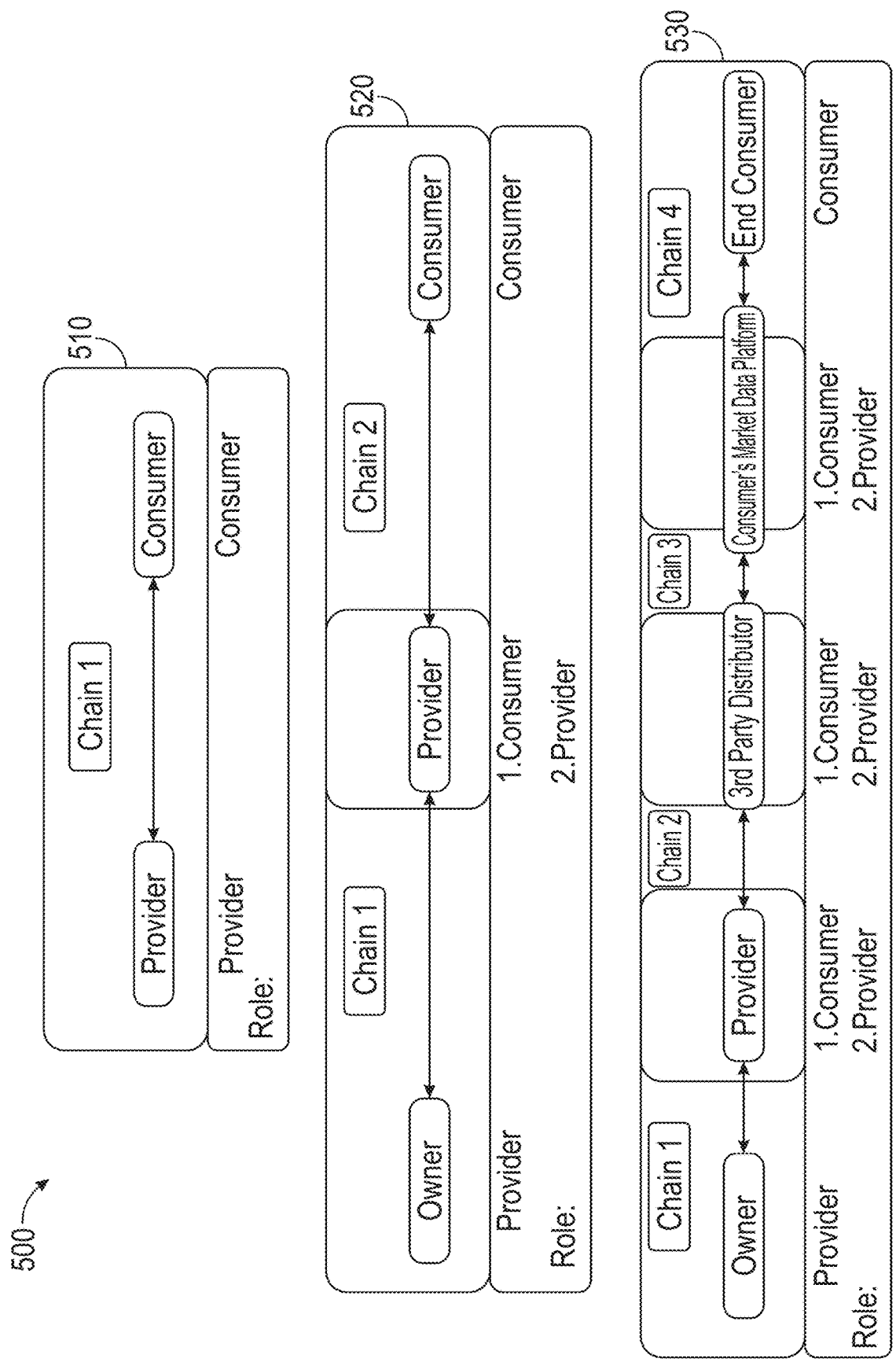
FIG. 5 is an exemplary illustration of a daisy chain of the system of FIG. 3, in accordance with aspects of the present disclosure.

Referring to FIG. 5, DRM system 200 may include method 500 for creating a daisy chain. A daisy chain may include a series of data exchanges (i.e., transactions), where data from a single provider device 270 was passed to multiple consumer device 260. The arrangement of data exchanges along the daisy chain may enable an entity such as network, business unit, or user (e.g., consumer device 260 or provider device 270) to both receive data from a provider device 270 and share data with a consumer device 260, such as products and/or services. In doing so, the entity may act as both a consumer device 260 and provider device 270 (i.e., a CtP), providing a versatile platform in complex data exchange arrangements. Therefore, the daisy chain provides the benefit over traditional DRM systems of efficient, flexible data distribution between individuals and/or institutions in a controlled and secure manner, while providing a dynamic role for a consumer device 260 and/or producer (e.g., as opposed to traditional DRM systems which focus on preventing access and/or duplication). The flexibility of the daisy chain enables data to be widely disseminated and used while maintaining security and/or control over the data.

In step 510, a consumer device 260 may receive and store data from a provider device 270 in chain 1. If the consumer device 260 wishes to redistribute the data, they begin an initiation process. The initiation process may verify the consumer device 260's rights regarding data redistribution, such as whether a DLA permits redistribution. If permitted to redistribute the data, the consumer device 260 may then enter parameters regarding subsequent redistribution, such as the price, number of subsequent redistribution allowed, and/or any other specific terms and conditions.

Next in step 520, the consumer device 260 in chain 1 may act as a provider device 270 to distribute the received data to a second consumer device 260, linking chain 1 to chain 2. This creates subsequent levels of the daisy chain in a multi-tiered process. At each level, the method 500 ensures appropriate revenue splits. For example, the second provider device 270 may retain a portion of the sale but may also owe a percentage to the initial provider device 270, and subsequently any other provider device 270 up the chain. In addition, at each level, method 500 ensures proper licensing.

Then, in step 530, the second consumer device 260 may act as a provider device 270 (i.e., third party distributor), distributing the data to a third consumer device 260, linking chains 1, 2, and 3. Then, the third consumer device 260 may act as a provider device 270 (i.e., on the third consumer device 260's market data platform), distributing the data to an end consumer device 260, linking chains 1, 2, and 3 to chain 4.

In aspects, a smart contract (e.g., DLA) may evaluate requests along a daisy chain. The smart contract may ensure compliance with all relevant laws, regulations, and agreements, including any DLAs. The smart contract may be stored once on the P2P network of DLA system 200, providing reference across multiple parties. In aspects, the smart contract may be stored in multiple places between individual parties on the daisy chain. The smart contract in use with the daisy chain may provide the benefit over traditional DRM systems of controlled, secure, and compliant data exchange when data is widely disseminated.

In aspects, DRM system 200 may automatically create a data license and/or smart contract (e.g., DLA). For example, as a CtP redistributes data, an automatic license generation process creates a new license for the receiving party. The automatically generated license (AGL) may detail the rights of the new consumer device 260 and the obligations to the provider device 270. In aspects, the AGL may auto-execute when a redistribution occurs. This provides the benefit of payment assurance up the daisy chain at each step with a scalable, flexible authorization. Moreover, the AGL may handle royalties or fees. For example, the AGL may pay royalties back to the original provider device 270.

In aspects, the daisy chain produced by method 500 may be extended indefinitely. Therefore, once a consumer device 260 receives data, they may act as a provider device 270, then the following consumer device 260 may act as a provider device 270, etc., thereby extending indefinitely. An indefinite daisy chain may offer a vast network of exchange for request and approval information, which is passed from one entity to another. Such an indefinite daisy chain may therefore provide the benefit over traditional DRM systems of widespread data dissemination and utilization, which may be particularly valuable in large networks and/or complex ecosystems where entities may benefit from accessing the same data. This data chain may lead to increased collaboration, efficiency, and innovation as data is shared and used across different parts of the DRM system 200.

In aspects, the DRM system 200 may integrate with a financial instrument, such that datasets are linked to representations of economic value. This provides the benefit over traditional DRM systems of adding an economic layer to incentivize participation, add trading dimension, and enrich overall value proposition of the DRM system 200. For example, when a dataset is linked to a green loan, the financial instrument may represent the expected economic benefits of using a particular dataset to validate green initiatives and/or to ensure compliance with sustainability measures. This provides the benefit of a financial instrument that may incentivize provider device 270 to share valuable datasets. For example, the higher the quality and applicability of the dataset, the higher the potential value of the associated financial instrument may be. A high potential value may subsequently influence the terms of a loan or interest rate. Further, for green loans or other sustainability-backed financing, the financial instrument may serve as a form of collateral or insurance.

The daisy chain may directly impact the dynamics of an integrated financial instrument in DRM system 200. In aspects when data is redistributed, its perceived value may change. For example, a frequently redistributed dataset may increase the value of the associated financial instrument due to its popularity and/or applicability. In this example, each time the financial instrument is redistributed, a royalty or fee may be distributed up the daisy chain back to the provider device 270. The DRM system 200 may automate tracking and distribution of royalties or fees using the integrated blockchain technology. This provides the benefit of assurance that every participant is compensated.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above are also intended to be within the scope of the disclosure.

What is claimed is:

1. A system for digital rights management, comprising:
 a decentralized ledger;
 a processor; and
 a memory, including instructions stored thereon, which when executed by the processor, cause the system to:
  receive a first request for access to a dataset stored at a first device from a second device;
  determine a compliance of the first request with a predefined rule recorded on the decentralized ledger;
  transmit a first copy of the dataset at the first device to the second device based on the determined compliance of the first request;
  generate a first log by the first device and a second log by the second device, the first log including a first status based on completion of the transmission by the first device, and the second log including a second status based on receipt of the transmission at the second device;
  determine a completion of the first request based on the first status in the first log matching the second status in the second log; and
  transmit a second copy of the dataset from the second device to a third device based on a second request.

2. The system of claim 1, wherein the decentralized ledger is implemented using a blockchain.

3. The system of claim 1, wherein the first request is a request for at least one of a recurring data feed, movie, a security, a song, digital art, or a non-fungible token (NFT).

4. The system of claim 1, wherein the first request includes at least one of an IP address, a URL, a location of the first device, or a location of the second device, or an intended use case for the dataset.

5. The system of claim 1, wherein the predefined rule is a license term including at least one of an authorized scope, an authorized purpose, or regulations related to the dataset.

6. The system of claim 1, wherein the instructions, when executed by the processor, further cause the system to:
 generate a unique identifier corresponding to the dataset, wherein the unique identifier includes at least one of an instrument number, a user identifier, an institution identifier, a license number, or a checksum.

7. The system of claim 6, wherein the first request and the second request are linked based on the unique identifier, thereby enabling redistribution of the dataset as part of a daisy chain.

8. The system of claim 1, wherein the instructions, when executed by the processor, further cause the system to:
 generate an encrypted dataset at the first device; and
 access the encrypted dataset at the second device using a decryption key.

9. A processor-implemented method for digital rights management, the method comprising:
 receiving a first request for access to a dataset stored at a first device from a second device;
 determining a compliance of the first request with a predefined rule recorded on a decentralized ledger;
 transmitting a first copy of the dataset at the first device to the second device based on the determined compliance of the first request;

generating a first log by the first device and a second log by the second device, the first log including a first status based on completion of the transmission by the first device, and the second log including a second status based on receipt of the transmission at the second device;

determining a completion of the first request based on the first status in the first log matching the second status in the second log; and transmitting a second copy of the dataset from the second device to a third device based on a second request.

10. The method of claim 9, wherein the ledger is implemented using a blockchain.

11. The method of claim 9, wherein the first request includes at least one of an IP address, a URL, a location of the first device, a location of the second device, or an intended use case for the dataset.

12. The method of claim 9, wherein the predefined rule is a license term including at least one of an authorized scope, an authorized purpose, or regulations related to the dataset.

13. The method of claim 9, further comprising:
generating a unique identifier corresponding to the dataset, wherein the unique identifier includes at least one of an instrument number, a user identifier, an institution identifier, a license number, or a checksum.

14. The method of claim 13, wherein the first request and the second request are linked based on the unique identifier, thereby enabling redistribution of the dataset as part of a daisy chain.

15. The method of claim 9, further comprising:
generating an encrypted dataset at the first device; and
accessing the encrypted dataset at the second device using a decryption key.

16. A non-transitory computer readable storage medium including instructions that, when executed by a computer, cause the computer to perform a method for digital rights management, the method comprising:
receiving a first request for access to a dataset stored at a first device from a second device;

determining a compliance of the first request with a predefined rule recorded on a decentralized ledger;

generating a first log by the first device and a second log by the second device, the first log including a first status based on completion of the transmission by the first device, and the second log including a second status based on receipt of the transmission at the second device;

determining a completion of the first request based on the first status in the first log matching the second status in the second log; and transmitting a second copy of the dataset from the second device to a third device based on a second request.

17. The system of claim 1, wherein the first status and the second status are determined based on details relating to the dataset and the first copy of the dataset, respectively, the details including at least one of a row count or an available balance.

18. The system of claim 17, wherein the instructions, when executed by the processor, further cause the system to:
determine that the details included in the first log and the second log match at least one predefined condition; and
generate the first status and the second status as strings, the first status indicating a successful transmission by the first device, and the second status indicating a successful receipt of the transmission by the second device.

19. The system of claim 1, wherein the first log and the second log are recorded on the decentralized ledger.

20. The system of claim 1, further comprising:
receiving the second request for access to the first copy of the dataset stored at the second device from the third device; and
determining a compliance of the second request with the predefined rule, wherein the predefined rule enables at least one of indefinite redistribution or a permitted number of redistributions of the first copy of the dataset.

* * * * *